July 21, 1931.  H. KRULL  1,815,513
MANUFACTURE OF CELLULOSE FILMS
Filed June 18, 1928
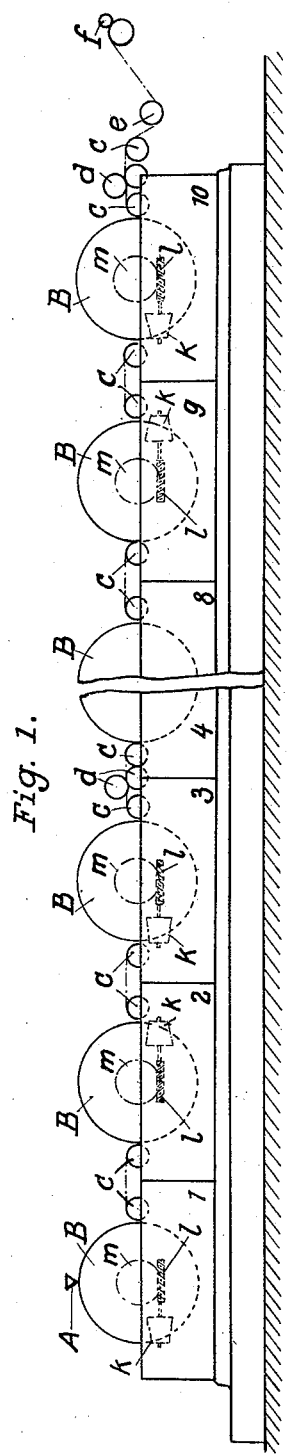
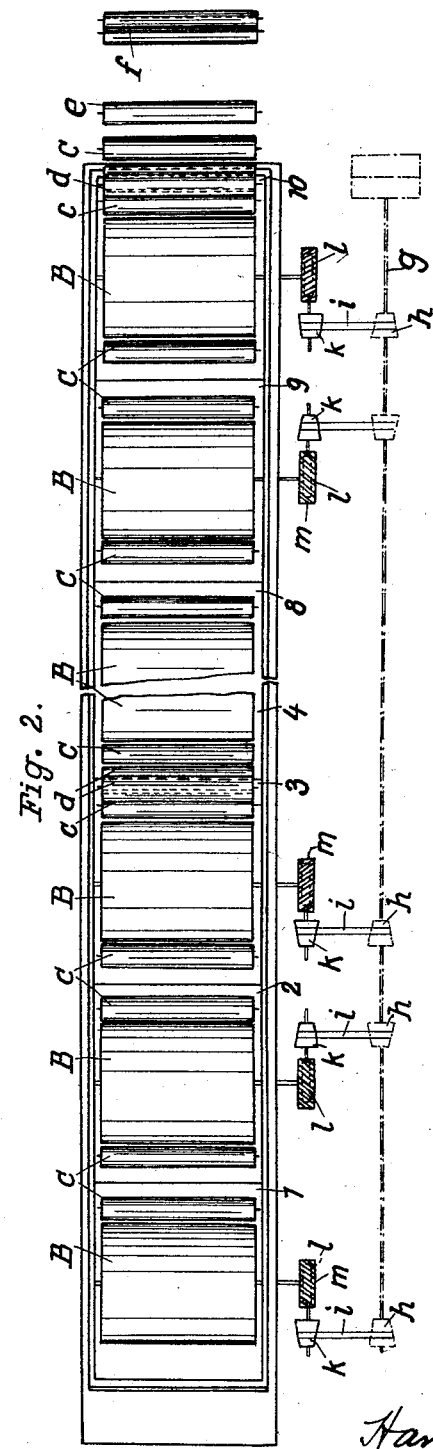
Inventor:
Hans Krull Patented July 21, 1931

1,815,513

UNITED STATES PATENT OFFICE

HANS KRULL, OF SCHOLWIN, NEAR STETTIN, GERMANY, ASSIGNOR TO THE FIRM FELD-MUHLE, PAPIER- UND ZELLSTOFFWERKE AKTIENGESELLSCHAFT, OF SCHOLWIN, NEAR STETTIN, GERMANY

MANUFACTURE OF CELLULOSE FILMS

Application filed June 18, 1928, Serial No. 286,457, and in Germany May 10, 1927.

The present invention relates to the manufacture of cellulose films of any desired length from aqueous cellulose solutions, preferably from a viscose solution, by the introduction of the said solution in a thin layer into a coagulation liquid. The invention has for its object to facilitate the treatment of the films produced by the introduction of the solution into the coagulation liquid, and more particularly to avoid disturbances or trouble during the further treatment of the films with the hardening, washing, bleaching and the like liquids.

An important point in the further transport of the film coming out of the coagulation bath is the adaptation to the shrinking of the film which takes place and is of different value at the different stages. This shrinking or contraction of the film makes it impracticable to use guide bands, as in such a case the film must be given the same speed of transport throughout the whole extent of the guide band, which in view of the great extension of the band is not coordinated with the unequal shrinking.

This difficulty is avoided according to the present invention by providing the guide rollers with a smoothly polished surface and by guiding the film over the guide rollers in such a manner that it shall constantly rest thereon with the same surface, so that a roughening of the surface which comes in contact with the rollers of the installation, by the action of the liquid will be avoided. By proceeding in this manner, it is possible to provide the different rollers according to requirements with individual drives to compensate for the normal shrinkage taking place in the different film sections, whilst any differences still remaining between the individual drive chosen and the shrinkage actually taking place, can be compensated for by slip movement between the polished roller surfaces and the film surface, which latter gradually becomes smoother without any risk of injuring the film.

An arrangement of an apparatus constructed in accordance with the preceding described practice is illustrated in the accompanying drawings for the purpose of more fully explaining the invention. In these drawings Figure 1 is a side elevation; and Fig. 2 is a plan view. In the arrangement illustrated, I show a plurality of rolls arranged side by side, each of which rotates in a separate tank, which tanks together form a trough about 20–25 meters long. The tanks are marked 1—4 and 8, 9 and 10, it being assumed that between the two sections of the apparatus, shown in the drawings there are arranged other tanks 5—7 in which also rotate rolls. The tanks are intended to be arranged in groups as shown to receive liquids for the precipitation, hardening, washing, bleaching and colouring.

Into each tank dips a rotatable cylinder or roll B, as previously indicated. All of the cylinders B are preferably made of the same size, have a smoothly polished cylindrical surface and are perfectly liquid tight on their surface as well as at the front ends. Each of these cylinders B is connected to a drive so as to form a transport roll for the film. A common driving shaft $g$ is provided for all the rolls B. This shaft $g$ is shown in Fig. 2 as carrying a number of cone pulleys $h$, each connected by a belt $i$ with a cooperating cone pulley $k$ mounted on the shaft of a worm $l$ in mesh with a worm wheel $m$ on the shaft of a cylinder B. Thus each cylinder B is provided with an independent variable speed drive allowing adaptation of the rotational velocity to the change in length of the film during the manufacturing process. Each of the cylinders B has idle guide rollers $c$ arranged adjacent to it, one for feeding the film to the cylinder and the other for taking it from the cylinder. After the arrangement of apparatus for performing each of the working processes of precipitation, hardening, washing etc. are arranged presses $d$, the degree and angle of pressure of which are adjustable.

The viscose ripe for the treatment is spread by means of a pouring device A on the roll B which is the first in the series and which needs no receiving roller. This first rotating cylinder B carries the viscose layer adhering to it into the precipitation liquid in the tank 1. At the beginning of the working, the coagulated band or web is transferred by hand and delivered to the pressing-on roller *c* of the cylinder B in tank 2 and, after coming out of the tank 2, in the same way to the roll B rotating in the tank 3 which is also assumed to be still filled with the precipitation liquid, whereupon the film, on leaving, is expressed by the press *d* and thereafter delivered to the roll B rotating in the acid tank 4. The film passes thus successively through the various tanks and finally comes out of the tank 10, and after having been again expressed by the press *d* adjacent to tank 10 passes over the last guide rollers *c* and *e* to a rod *f* on which it is wound in a still moist state. The individual drives of the rolls B are adjustable independently in such a manner that the speed of passage of the film, in the several stages of treatment, through the apparatus can be adjusted as required in accordance with the normal shrinkage taking place, as hereinbefore indicated.

It will be seen from the drawings that throughout its passage through the apparatus, the same face of the film is in contact with the rolls B, so that it is smoothed by the smoothly polished roll surfaces, owing to which, when slip becomes necessary, the rolls can slip with their polished surface on the smooth film surface without an excessive friction.

The driving of the winding rod *f* is preferably effected by means of a friction clutch, owing to which a tight winding of the film can be obtained.

What I claim is:—

A device for manufacturing cellulose films of any desired length from aqueous cellulose solutions, preferably from a viscose solution, comprising a plurality of tanks and a plurality of transport rolls, each tank having coordinated therewith one of said transport rolls having a smoothly polished surface, individual adjustable drives for a number of said transport rolls whereby shrinkage of the film may be compensated for by appropriate adjustment of roll speed, a viscose pouring device in cooperative relation to that transport roll which is the first in the series of rolls, two idle rollers between each two adjacent transport rolls in the series of said rolls, one of said idle rollers adapted to take off the film from one roll of the two and the other idle roller adapted to receive the film and transmit it to the second one of the adjacent transport rolls, the film being thus so passed through said baths that one and the same surface of it only is subjected to the action of such baths, and its opposite surface is maintained smooth by contact with the polished surfaces of said rolls.

In witness whereof I affix my signature.

Dr. Ing. HANS KRULL.